United States Patent [19]

Kobayashi

[11] Patent Number: 4,733,572

[45] Date of Patent: Mar. 29, 1988

[54] LINER RECIPROCATING MOTION DEVICE AND OPTICAL CARD TRANSPORTING DEVICE WHICH EMPLOYS THE SAME

[75] Inventor: Koichi Kobayashi, Yokohama, Japan

[73] Assignee: Kabushiki Kaisha Toshiba, Kawasaki, Japan

[21] Appl. No.: 886,907

[22] Filed: Jul. 18, 1986

[30] Foreign Application Priority Data

Nov. 27, 1985 [JP]  Japan ................................. 60-264943
Dec. 5, 1985 [JP]  Japan ................................. 60-272420

[51] Int. Cl.[4] .......................... F16H 21/20; F16C 3/28
[52] U.S. Cl. ............................................. 74/44; 74/602
[58] Field of Search ........................... 74/601, 602, 44

[56] References Cited

U.S. PATENT DOCUMENTS 403,072  5/1889  Quimby ................................. 74/602
1,022,621  4/1912  Clyne ................................... 74/602

FOREIGN PATENT DOCUMENTS 58-118368  7/1983  Japan .
59-149576  8/1984  Japan .
60-260757  12/1985  Japan .
75487  8/1917  Switzerland ........................ 74/602

OTHER PUBLICATIONS

Brown, 507 *Mechanical Movements,* 1893, pp. 46–47.
Newell et al., *Ingenious Mechanisms for Designers and Inventors,* vol. IV, 1967, pp. 17–20, pp. 204–205.

*Primary Examiner*—Lawrence Staab
*Attorney, Agent, or Firm*—Schwartz, Jeffery, Schwaab, Mack, Blumenthal & Evans

[57] ABSTRACT

A linear reciprocating motion device according to the present invention comprises an object which is movable exclusively in a prescribed direction, a cam groove which is formed on a closed curve, a linking rod whose one end is connected to said object and its the other end is engaged with said cam groove, and means for moving the other end of said linking rod along said cam groove with a prescribed angular velocity. The moving means with angular velocity comprises a crank arm whose length is free to be increased or decreased, with its one end connected to the other end of said linking rod and rotates in the interior of said closed curve, and a motor that causes to rotate the crank sub-arm that is linked to the crank arm at a constant speed.

3 Claims, 46 Drawing Figures

LINER RECIPROCATING MOTION DEVICE AND OPTICAL CARD TRANSPORTING DEVICE WHICH EMPLOYS THE SAME

BACKGROUND OF THE INVENTION

The present invention relates to a device for converting a constant speed rotational drive to a linear reciprocating motion, in particular to a linear reciprocating motion device which can perform a linear reciprocating motion of arbitrary speed pattern and an optical card transporting and holding device which employs the same reciprocating motion device.

In general, in a field such as machine tool, it becomes frequently necessary to give a linear reciprocating motion to a material to be scraped or cut. Such a linear reciprocating motion is employed also in the field of precision machinery, office automation apparatus, printing device, and so forth, in addition to the field of machine tool.

Moreover, in carrying out recording and reproducing for an optical recording medium of card type (referred to as the optical card hereinafter) which is being watched lately, it is also necessary to move the optical card in a reciprocating manner along a straight line.

In recording information on the optical card, information is recorded on the reflecting surface side of the optical card as a group of fine holes that are disposed linearly parallel to the edge of the optical card. In order to record information in this manner, or to read information that is recorded in such a fashion, laser light from the pickup unit of the optical system that is focused on the reflecting surface of the optical card has to be moved relative to the row of information holes. That is, by giving the optical card a linear reciprocating motion, laser light is arranged to trace the row of information holes.

Further, in addition to the linear reciprocating motion of the optical card, in order to be able to read information from any location on the optical card, the optical pickup unit that reads information by the use of the reflected laser light has to be moved linearly in the direction which is perpendicular to the direction of the linear reciprocating motion of the optical card, as well as in the direction parallel to the optical card, as shown in FIG. 1.

As a device for giving the optical card a linear reciprocating motion, there is known a method in which the repeated forward and backward motion of a motor is converted into a linear reciprocating motion by means of belts or racks and pinions or like devices. However, in the method where the forward and reverse rotation of the motor are repeated for each round trip of the linear motion, it is necessary to repeat to build up the motor to a high speed, decelerate it quickly, and build up again the reverse rotation of the motor, in a short time. Moreover, the power of the motor has to be sufficiently high in order for these operations to be accomplished with ease.

Further, by rotating the motor continuiously in one direction, instead of switching between forward rotation and reverse rotation, and by the use of a crank mechanism as shown in FIG. 2, there may also be obtained a linear reciprocating motion. Let the length of the crank arm R, the length of the linking rod L, and the stroke of the linear reciprocating motion of the optical card S. When the crank arm rotates due to the rotation of the motor with a fixed angular velocity ω, the motion will be described by $$S = L + R(1 - \cos\omega t) - \sqrt{L^2 - R^2 \sin\omega t}$$

One notes, however, that this motion does not satisfy the condition of a motion with constant speed. It is said that the linear reciprocating motion for the optical card during recording and reproducing is required a linear reciprocating motion with constant speed of sufficient precision.

To obtain a constant linear reciprocating motion by the use of a crank mechanism, there may be considered the following electrical rotation speed control method. Namely, by detecting the moving speed and the angular phase of the crank mechanism, and feeding these data back to the rotation driving unit of the motor, the rotation speed of the motor is varied by comparing the value fed back and the speed of motor rotation. In connection with this method, however, there arise not only the problem of intricacy of the control circuit but also such problems as the inertia on the motor and the increased burden on the electrical control of acceleration and deceleration.

Moreover, in order to carry out recording or reproducing for card 1 with such a transporting and holding device, the optical card 1 has to be given a reciprocating motion that has a speed which is practical for recording and reproducing (for instance, about 3.5 Hz), so that care has to be taken to prevent slippage in positioning of the optical card 1 during recording and reproducing. Moreover, it is desirable for the operator that the operation of insertion and retrieval of the optical card 1 is easy to perform.

SUMMARY OF THE INVENTION

An object of the present invention is to provide a system which converts a constant speed rotational motion to a constant speed linear reciprocating motion.

Another object of the present invention is to provide a linear reciprocating motion device that has a very simple construction.

A further object of the present invention is to provide a desired linear reciprocating motion device by a minor alteration procedure.

A further object of the present invention is to provide an optical card transporting system in which the operation of insertion and retrieval of the optical card is simple.

A further object of the present invention is to provide an optical card transporting system which can prevent slippage in positioning of the optical card during recording and reproducing.

A still further object of the present invention is to provide an extremely simple optical card transporting system.

DETAILED DESCRIPTION OF THE PREFERRED EMBODIMENTS

Figure 1:
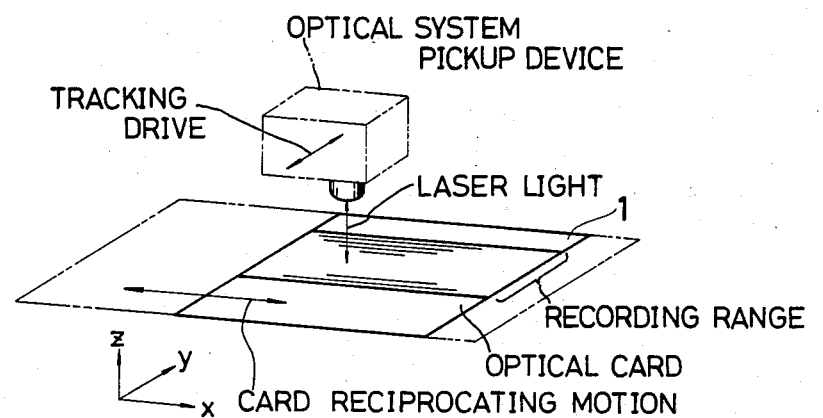
FIG. 1 is a diagram for explaining the concept of an optical card recording and reproducing device.
Figure 2:
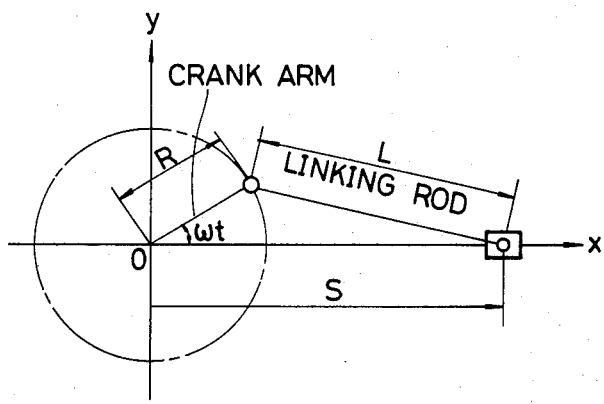
FIG. 2 is a diagram for explaining a general crank mechanism.
Figure 3A:
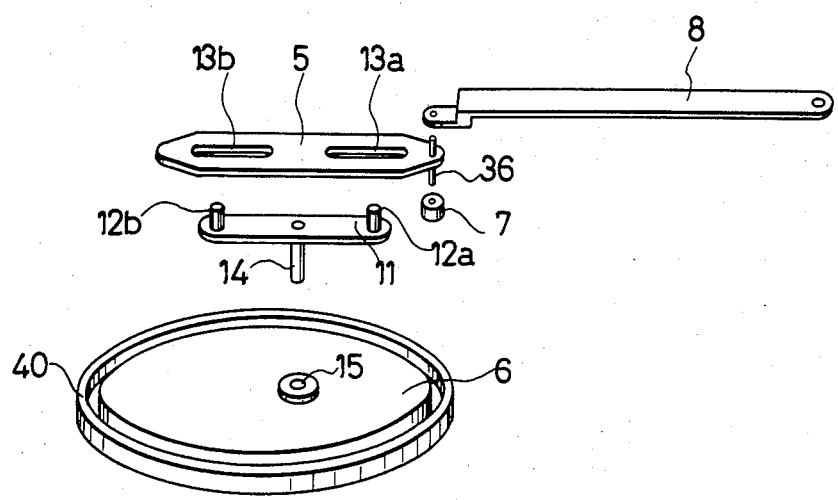
FIGS. 3 (A) and 3 (B) are disassembled perspective view and exterior perspective view, respectively, of a linear reciprocating motion device.
Figure 3B:
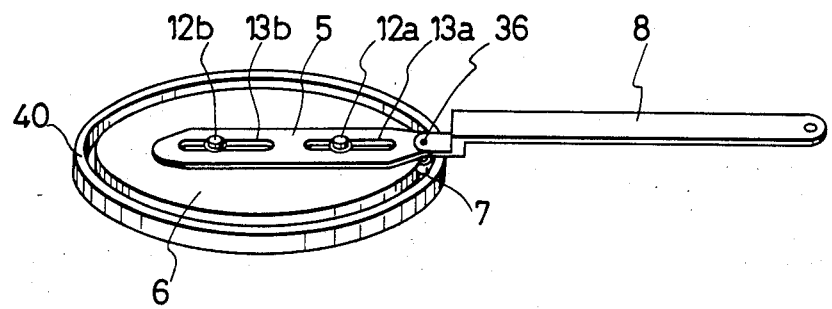
Figure 4A:
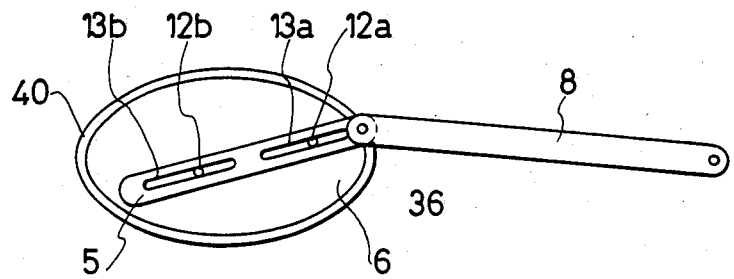
FIGS. 4 (A) to 4 (C) are a diagram for explaining the operation of the linear reciprocating motion device of the present invention.
Figure 4B:
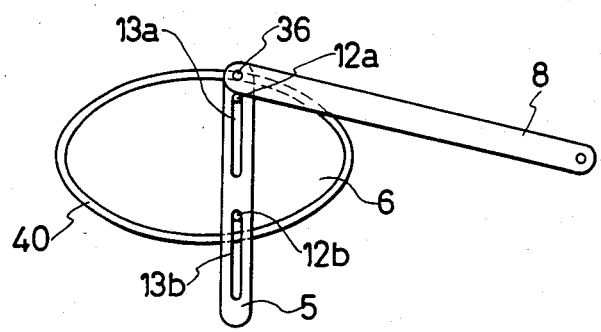
Figure 4C:
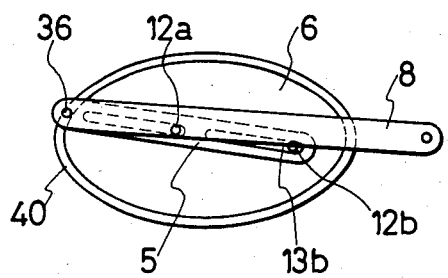

FIG. 3 (A) is a disassembled perspective view showing the principal part of an embodiment of the linear reciprocating motion device of the present invention, FIG. 3 (B) is its exterior perspective view, and FIG. 4 is a diagram for explaining its operation.

As shown in FIGS. 3 (A) and 3 (B), a crank sub-arm 11 which is provided with a shaft 14 that receives a rotating power from the side of a driving motor (not shown), is rotated with the shaft 14 as the center. On a crank arm 5 there are provided two slits 13a and 13b that are engaged slidably with the two pins 12a and 12b that are planted in the crank sub-arm 11. Through the sliding of the pins 12a and 12b in the slits 13a and 13b, the crank arm 5 is made slidable with respect to the crank sub-arm 11. With this arrangement, the length from the shaft 14 to a pin 36 that is fixed on one end of the crank arm 5, namely, the length of the arm, can be increased or decreased. The sliding mechanism due to the slits 13a and 13b and the pins 12a and 12b may be substituted by some other structure.

One end of a linking rod 8 is fitted freely turnably to the pin 36 that is fixed on one end of the crank arm 5, while the other end is linked to a body to be driven to realize a reciprocating motion along a straight line.

Further, the shaft 14 of the crank sub-arm 11 is fitted into a bearing 15 of a guiding cam 6, and a cam follower roller 7 is fitted freely turnably to the guiding cam 6 side of the pin 36 which is linked to one end of the linking rod 8, and is linked to a cam groove 40 in the guiding cam 6. When the crank sub-arm 11 is rotated around the shaft 14, the cam follower roller 7 is guided by the cam groove 40, and the crank sub-arm 11 draws a locus that is defined by the guiding cam 6 while varying its arm length.

Here, the form of the guiding cam 6 is determined geometrically by the requirement that the linear reciprocating motion be realized for the body to be driven according to the desired patterns. Further, the guiding cam 6 may be either fixed, or rotated with the bearing 15 as the center.

FIG. 4 is a diagram for explaining the operation. It shows the case when the form of the guiding cam 6 is nearly elliptic, the rotation center of the crank sub-arm 11 does not coincide with the center of the ellipse, and the guiding cam 6 is fixed.

When the crank sub-arm 11 is rotated in the counter counterclockwise direction in the figure, the crank arm 5 is rotated with its arm length varied in the order of FIGS. 4 (A), 4 (B), and 4 (C), with the slits 13a and 13b sliding with respect to the pins 12a and 12b. Then, the tip of the linking rod 8 performs a linear reciprocating motion.

By referring to the figures, description will be given about an embodiment of the case in which the linear reciprocating motion device is incorporated in the optical card recording and reproducing device.

First, in order to move the optical card with constant speed in a linear reciprocating manner during recording and reproducing, the locus of the linking point Q (shown in FIG. 5) of the crank arm and the linking rod has to be determined so as to realize a constant speed linear reciprocating motion of the optical card. Referring to FIGS. 5 to 12, the procedure will be described in what follows.

Figure 6:
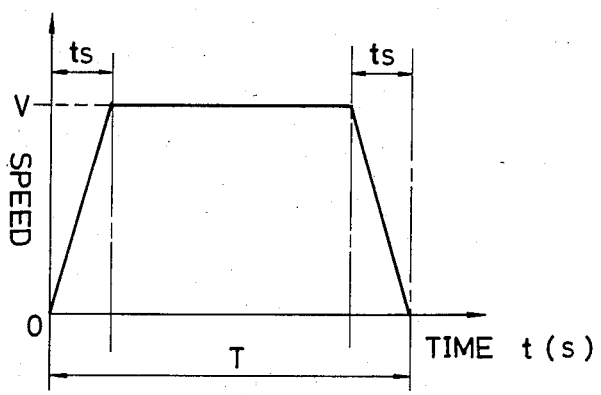

During recording and reproducing, the optical card has to perform a constant speed linear motion, and undergo deceleration and acceleration when the direction of motion is to be reversed. In such a case, the relationship between the speed and the time will be as shown in the diagram of FIG. 6. In FIG. 6, the ordinate is the speed v and the abscissa is the time which is set with the time T as a parameter. The figure shows that the optical card is accelerated from speed O to speed v during a time $t_s$ from time O, then performs a linear motion with constant speed v, and is decelerated again from the constant speed v to speed O during a time $t_s$, performing the operation of one half of a cycle. In the next half cycle, a similar linear motion in the reversed direction is performed with the motions of acceleration-constant speed-deceleration, completing the operation of one cycle.

Although in the present embodiment it is assumed that the acceleration and the deceleration during the accelerating and decelerating periods are performed with constant acceleration, it does not have to be performed in that way.

As indicated in FIG. 6, the time required for the operation of one half of a cycle is called T, and the time required for acceleration or deceleration is called $t_s$.

Figure 7:
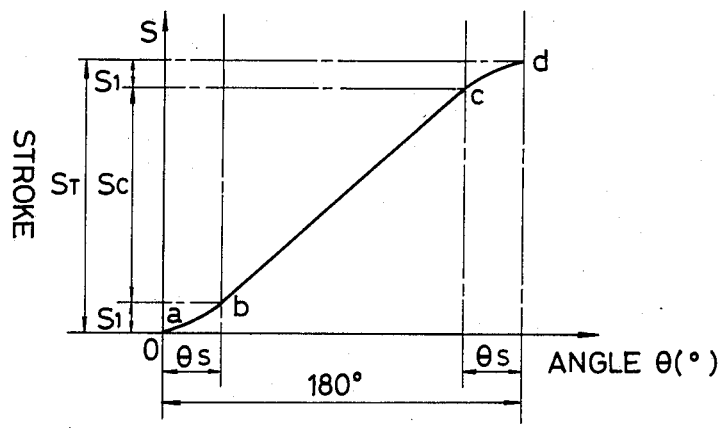
Figure 8:
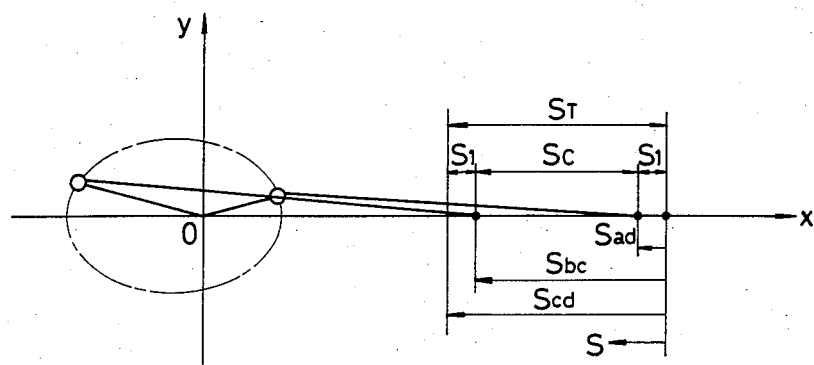
FIGS. 8, 9, 10 (A) to 10 (C), 11 and 12 are diagrams for explaining the form of the guiding cam of the optical card recording and reproducing device according to the present invention.

Further, as shown in FIGS. 7 and 8, the total stroke for the linear reciprocating motion, the stroke for the segment of the motion of constant speed, and the stroke for the segment of the acceleration or the deceleration are called $S_T$, $S_C$, and $S_1$, respectively.

Among the above quantities the following relations hold. Namely, $$S_1 = v \, t_s/2 \tag{1}$$

$$S_T = v(T - t_s) \tag{2}$$

From Eq. (1) and Eq. (2) it follows that $$t_s = 2 S_1 T/(S_T + 2 S_1) \tag{3}$$

Figure 5:
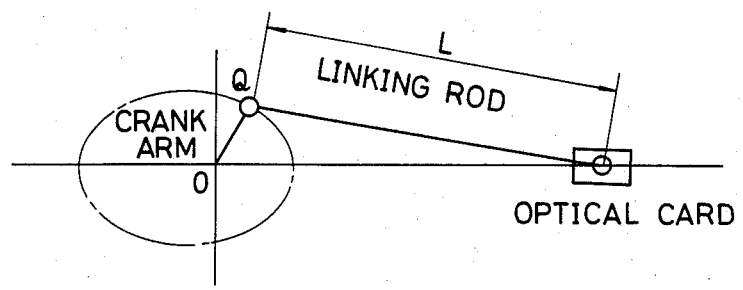
FIGS. 5 to 7 are diagrams for explaining the principle of operation of the linear reciprocating motion device for an optical card recording and reproducing device according to the present invention.

Next, by assuming that the crank arm shown in FIG. 5 rotates at a constant angular velocity $\omega$ (degree/sec) with the point O as the center, it rotates 180° during the time T for a half cycle, so that $$\omega t = 180 \tag{4}$$

Further, if the angle of rotation of the crank arm during the time $t_s$ for the segment of acceleration or deceleration is called $\theta s$, then one has $$\omega t_s = \theta s \tag{5}$$

From Eqs. (3), (4), and (5), $\theta s$ can be determined as follows.

$$\theta s = 2 S_1 180/(S_T + 2 \cdot S_1) \tag{6}$$

Next, referring to FIGS. 7 and 8, the stroke S corresponding to an arbitrary rotation angle $\theta$ will be obtained.

The stroke Sab for the acceleration segment (part ab) of FIG. 7 is given by $$Sab = S_1 \theta^2/\theta s^2 \tag{7}$$

The stroke Sbc for the constant speed segment (part bc) is given by $$Sbc = S_1 + Sc(\theta - \theta s)/(180 - 2 \theta s) \tag{8}$$

The stroke Scd for the deceleration segment (part cd) is given by $$Scd = S_T - S_1(\theta - 180)^2/\theta s^2 \tag{9}$$

Figure 9:
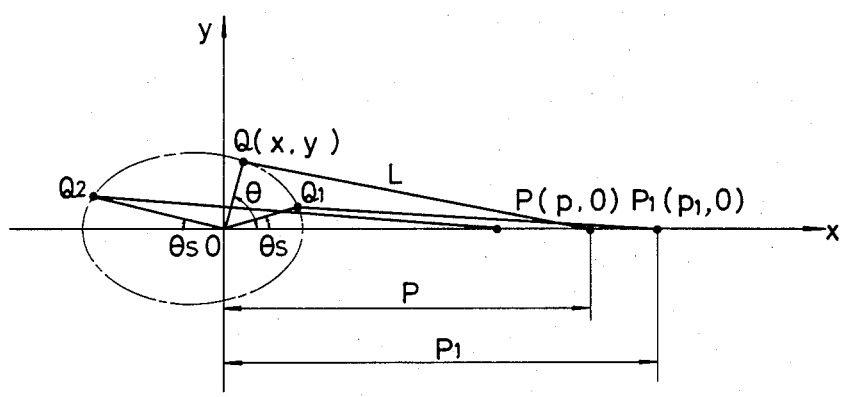

Namely, in FIG. 9, the linking point Q (x,y) of the crank arm and the linking rod will be assumed to move in the direction from $Q_1$ and $Q_2$, and that the optical card carries out constant speed linear reciprocating motion in the range between $\theta = \theta s$ and $\theta = 180 - \theta s$.

In addition, let the linking point of the linking rod on the optical card side be P (p, o), and the coordinates of the initial point of the constant speed motion be P1 (p1, 0).

If the length of the linking rod is L, the coordinates (x, y) of the locus of the point Q satisfy the following equations.

$$y = x \tan \theta \tag{10}$$

$$(x - p)^2 + y^2 = L^2 \tag{11}$$

Since the point P carries out a constant speed linear motion, it will be found with Eq. (8) that $$p = p_1 - Sc(\theta - \theta s)/(180 - 2 \theta s) \tag{12}$$

Figure 10A:
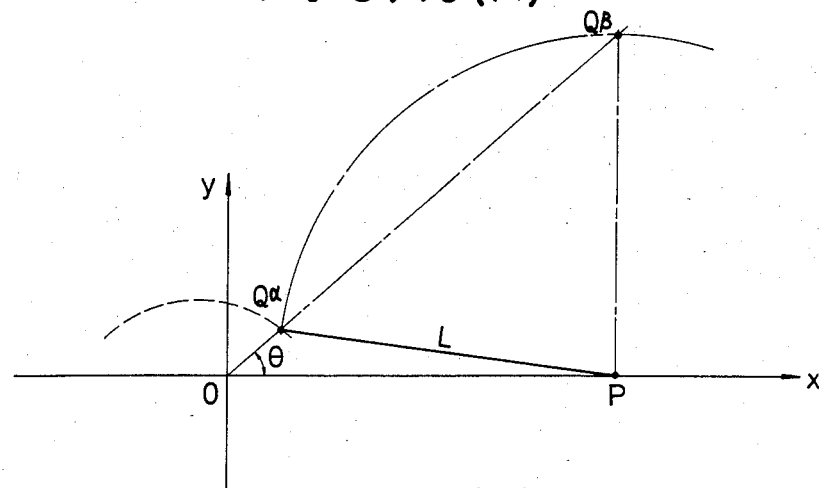
Figure 10B:
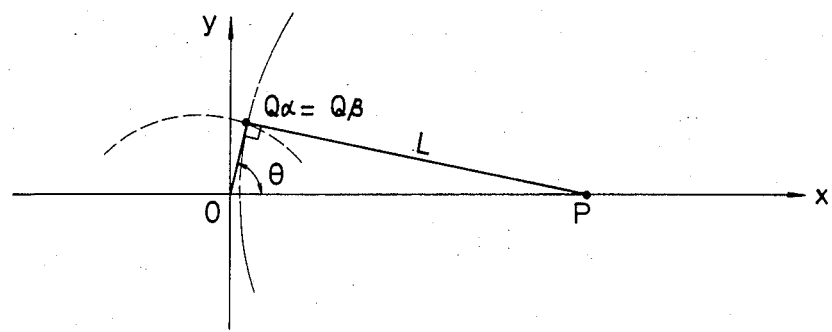
Figure 10C:
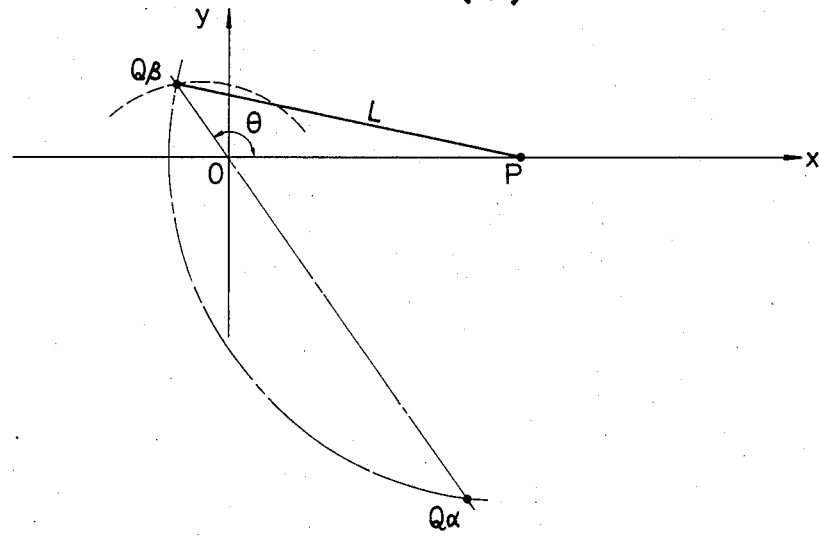

When the point Q moves from $Q_1$ to $Q_2$, the locus of Q for the segment of constant speed motion corresponding to each value of $\theta$ between $\theta = \theta s$ and $\theta = 180 - \theta s$ can be determined by finding the coordinates (x, y) of the point Q that satisfy Eqs. (12), (10), and (11). As shown by FIGS. 10 (A), 10 (B), and 10 (C), for each value of Q there can exist two possible solutions $Q\alpha$ and $Q\beta$. Selection between point $Q\alpha$ and $Q\beta$ as the desired locus for the point Q is made, except for the case as in FIG. 10 (B) where $Q\alpha = Q\beta$ holds, is dictated by the fact that it should be nearer to the rotation center of the crank arm, namely, the point $Q\alpha$ for FIG. 10 (A) and the point $Q\beta$ for FIG. 10 (C). The locus of the point Q has to be continuous. That is, with the increase in the value of the rotation angle $\theta$ of the crank arm, it is necessary to make a smooth transition from the locus of the point $Q\alpha$ to the locus of the point $Q\beta$, the switching point between the two being the state for which $Q\alpha = Q\beta$ holds that is shown in FIG. 10 (B).

From the above, with the requirement that there should exist a point for which $Q\alpha = Q\beta$ holds, the value of L has to be selected so as to ensure that the discriminant D of the quadratic equation $$(1 + \tan^2\theta)x^2 + 2px + p^2 - L^2 = 0 \tag{13}$$

deduced from Eqs. (10) and (11) satisfy the relation $D \geq 0$ including the case of equality sign.

The condition $D \geq 0$ for Eq. (13) gives rise to $$L^2 \geq p^2 \sin^2\theta$$

namely, $$L \geq p \sin\theta \tag{14}$$

Substituting Eq. (12) into Eq. (14), it leads to $$L \geq \{p_1 - Sc(\theta - \theta s)/(180 - 2 \theta s)\}\sin\theta$$

that is, $$L = max\{p_1 - Sc(\theta - \theta s)/(180 - 2 \theta s)\}\sin\theta \tag{15}$$

In this way, the length L of the linking rod can be determined.

As described in the foregoing, the locus of the point Q in the range $\theta s \leq \theta \leq 180 - \theta s$ can be found by determining the coordinates (x, y) for each point Q from Eqs. (12), (15), (10), and (11), as soon as the time T for one half of the cycle, the total stroke $S_T$ for the one-way trip of the reciprocating motion, the stroke Sc for the segment of constant speed running, and the coordinates ($p_1$, 0) of the point $P_1$ at which the accelerating motion shifts to the constant speed motion for the first time, are given as the design conditions.

Figure 11:
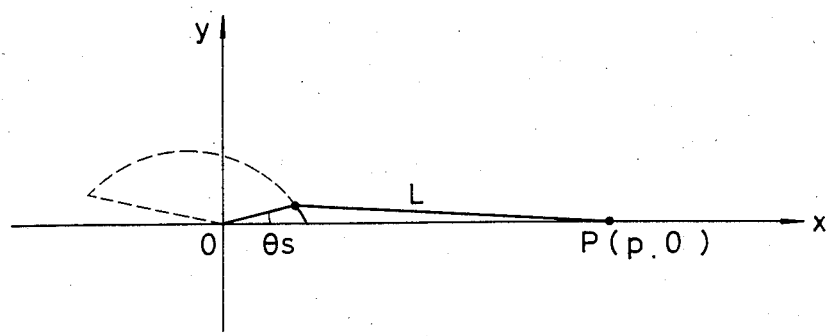

Next, the range of $\theta \leqq \theta \leqq \theta s$ corresponds to the segment in which the speed increases linearly with constant acceleration, as shown in FIG. 6. From this, the value of p in the coordinates (p, o) of the point P in FIG. 11 is given from Eq. (7) by $$p = p_1 + S_1 - S_1 \theta^2/\theta s^2 \tag{16}$$

Similarly, the coordinates (x, y) for each of the point Q in the accelerating segment can be determined from Eqs. (16), (15), (10), and (11), and hence the locus of the point Q.

Figure 12:
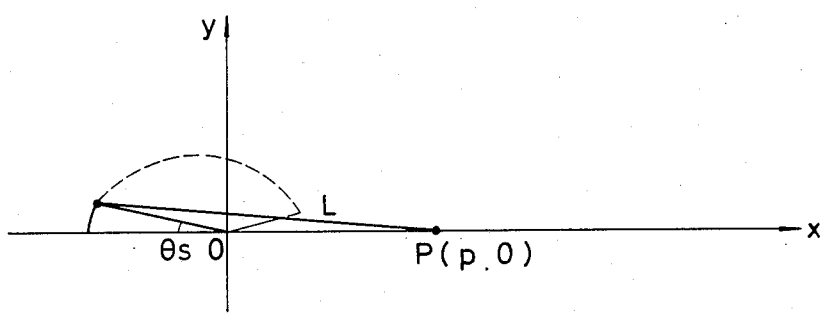

Further, the range of $180 - \theta s \leqq \theta \leqq 180$ corresponds to the segment in which the speed decreases linearly with constant acceleration, as shown in FIG. 6. From this, the value of p of the coordinates (p, o) for the point P in FIG. 12 is given from Eq. (9) by $$p = p_1 - Sc - S_1 + S_1 (\theta - 180)^2/\theta s^2 \tag{17}$$

Similarly, the coordinates (x, y) of each point Q in the decelerating segment can be determined by Eqs. (17), (15), (10), and (11), and hence the locus of the point Q.

In this way, for the range from 0° to 180° of the rotation angle $\theta$ of the crank arm, the locus of the linking point Q of the crank arm and the linking rod can be determined. It is clear that the locus of the point Q in the range from 180° to 360° of the rotation angle $\theta$ of the crank arm is the symmetrical figure with respect to the x-axis of the locus for the range from 0° to 180° obtained in the above.

As described in the foregoing, when the time T required for the operation of one half of the cycle, the total stroke ST for one way trip of the reciprocating motion, the stroke Sc for the segment of constant speed running, and the coordinates ($p_1$, 0) of the point $P_1$ at which the accelerating segment shifts to the constant speed motion for the first time, are determined as the design conditions, the time $t_s$ required for the accelerating or the decelerating segment and the rotation angle $\theta s$ of the crank arm can be determined. In addition, the length L of the linking rod, and the locus of the linking point, of the crank arm and the linking rod, that performs a constant speed linear reciprocating motion during recording and reproducing of the optical card, can also be determined.

By the rotation of the crank arm that is guided by a cam that has a locus as determined in the above, there can be realized a recording and reproducing device that was intended originally.

Referring to the figures, an embodiment of the present invention will now be described in the following.

Figure 13:
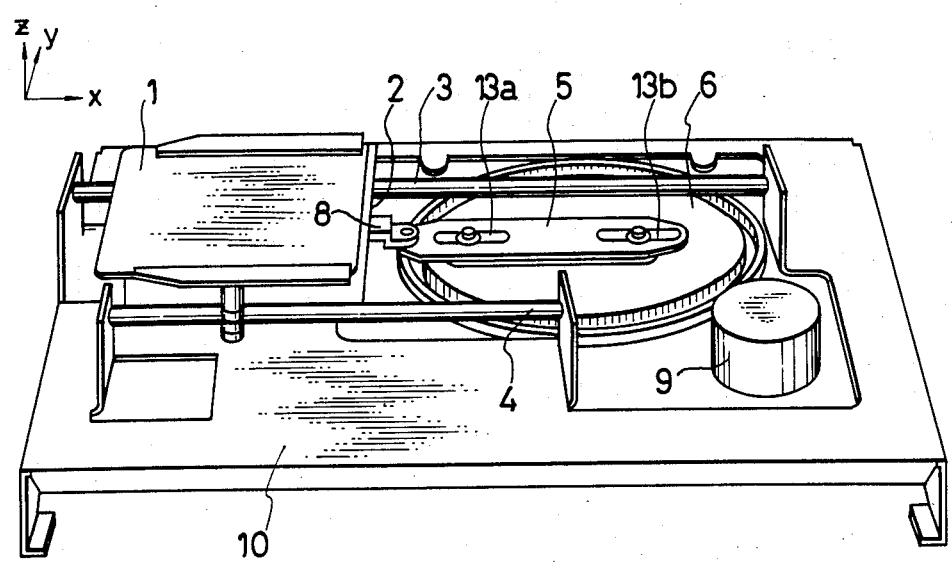
FIGS. 13, 14, and 15 are an exterior perspective view, an interior cross-sectional view, and a disassembled perspective view, respectively, of the optical card recording and reproducing device according to the present invention.
Figure 14:
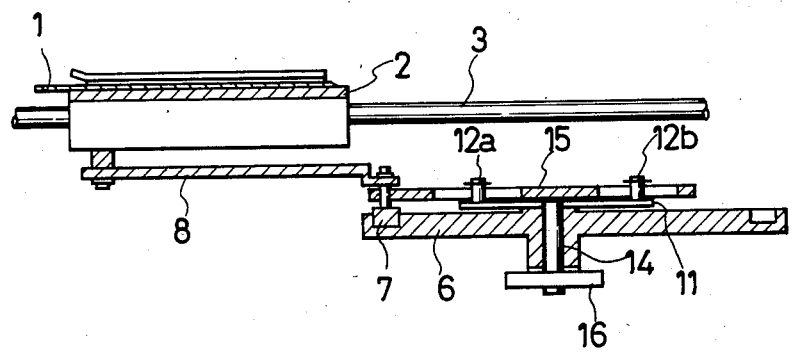
Figure 15:
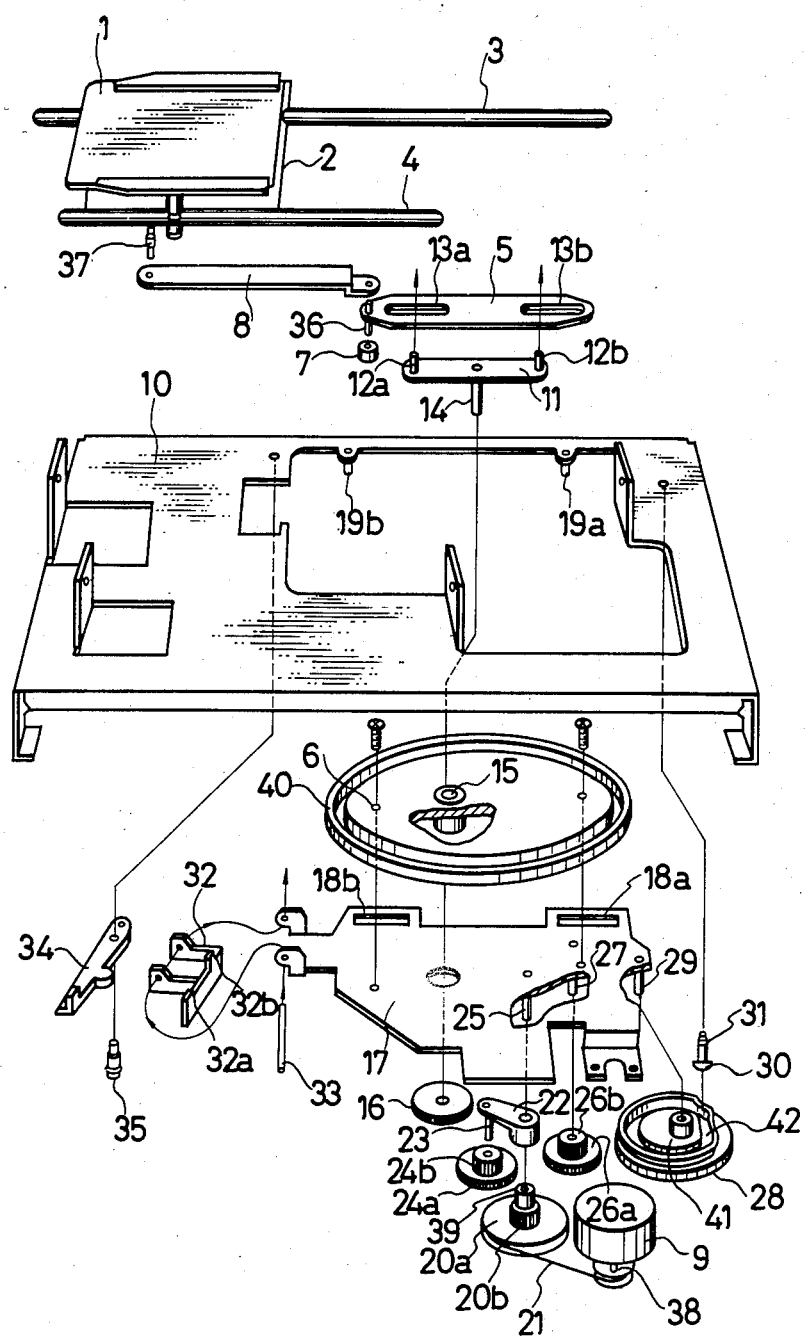
Figure 16A:
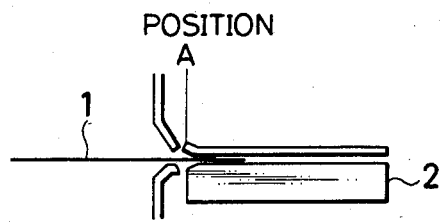
FIGS. 16 (A) to 16 (D) are a diagram for explaining the operation of the body of the shuttle of the optical card recording and reproducing device according to the present invention.
Figure 16B:
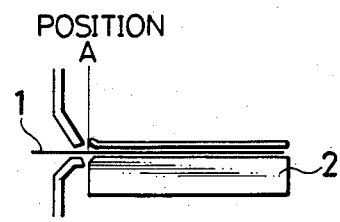
Figure 16C:
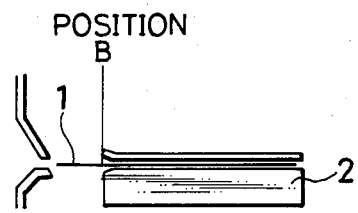
Figure 16D:
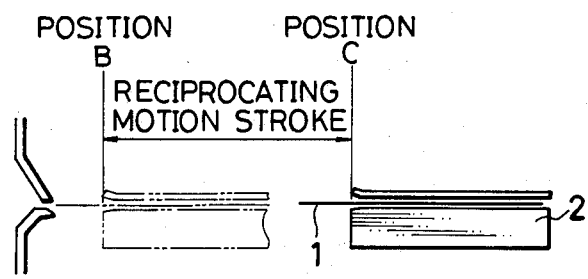

FIG. 13 is an exterior view of an optical card recording and reproducing device according to the present invention, Fig. 14 is a cross-sectional view of the interior, and FIG. 15 is a disassembled perspective view.

In FIG. 13 to FIG. 15, the optical card 1 is held by the main body of the shuttle 2. The guiding bars 3 and 4 support the shuttle body 2 slidably to guide the shuttle body 2 in its direction of motion, and both ends of the guiding bars are fixed to the body of the chassis 10. In the crank arm 5 there are provided slits 13a and 13b to which are engaged pins 12a and 12b that are planted on both ends of the crank sub-arm 11. Further, one end of the crank arm 5 is joined by the pin 36 to one end of the linking rod 8 free to turn. The other end of the linking rod 8 is joined by a pin 37 to the shuttle body 2 free to turn.

The form of the guiding cam 6 is determined by the method as described earlier so as to give the shuttle body 2 a linear reciprocating motion of nearly constant speed. Further, the bearing 15 is provided at a prescribed position in the guiding cam 6, and the shaft 14 that is planted at about the center of the crank sub-arm 11 engages the bearing 15. On the bottom end of the shaft 14 there is fixed a gear 16 by means of which the rotating power of the driving motor 9 is transmitted to the crank arm 5 via the crank sub-arm 11.

On the pin 36 of the crank arm 5 there is attached a cam follower roller 7 whose outer peripheral surface is fitted to the cam groove 40 of the guiding cam 6. As the gear 16 is rotated due to the rotation of the driving motor 9, the crank sub-arm 11 is rotated with the bearing 15 provided in the guiding cam 6 as the center. With the rotation of the crank sub-arm 11, the crank arm 5 is rotated also due to the engagement of the slits 13a and 13b to the pins 12a and 12b that are planted on both ends of the crank sub-arm 11. Then, the cam follower roller 7 that is engaged to the pin 36 at the tip of the crank arm 5 draws a locus along the form of the cam groove 40 of the guiding cam 6. By the sliding of the pins 12a and 12b in the slits 13a and 13b, the length of the crank arm 5 from the bearing 15 which is at the center of the rotation increases and decreases relatively.

On a sub-chassis 17 there are incorporated the guiding cam 6, the driving motor 9, and the gears for transmitting driving power that will be described later.

Formed on the sub-chassis 17 are slit apertures 18a and 18b which engage the pins 19a and 19b that are provided protruding from the chassis body 10. The sub-chassis is mounted on the chassis 10 so as to be able to slide in the direction of motion of the shuttle body 2.

A pulley 20a which is formed in a united body with a gear 20b is rotated by a pulley 38 via a belt 21 that is attached to the driving motor 9.

An arm 22 is fitted turnably to the boss of the gear 20b. At a tip of the arm 22 there is planted a pin 23, and gears 24a and 24b that are formed in a united body is fitted to the pin 23. The gear 24a is engaged to the gear 20b.

The pulley 20a is held by a post 25 that is provided on the bottom side of the sub-chassis 17 via the boss 39 which is inserted to the arm 22. Further a gear 23 equipped with a cam is held by a post 29 that is provided on the bottom side of the sub-chassis 17.

Formed into a united body with the gear 28 equipped with a cam, is an eccentric cam 41 whose cam groove 42 is fitted to a cam follower roller 30. The cam follower roller 30 is mounted on the chassis body 10, held by a supporting shaft 31.

Mounted rotatably on the sub-chassis 17 by a pin 33 is a locking lever 32 that acts to lock the unnecessary motion of the linking rod 8 during insertion and retrieval of the optical card 1. A push arm 34 is attached to the chassis body 10 by a pin 35. When the sub-chassis 17 is moved, the push arm 34 pushes the locking lever 32 to rotate, and acts to block the linking rod 8 at a predetermined position by holding it from both sides by the projections 32a and 32b of the locking lever 32.

With a construction as in the above, the operation of the present embodiment will now be described.

As shown in FIGS. 16 (A) and 16 (B), in the state of inserting and retrieving the optical card 1 from the body of the device (not shown), the tip of the shuttle body 2 is at the position A. Next, when the optical card is inserted and the shuttle body 2 is about to begin a linear reciprocating motion (namely, recording or reproducing), the tip of the shuttle body 2 is receded to the position marked as B in FIG. 16 (C) where the loading of the optical card 1 is completed. Then, as shown in FIG. 16 (D), the shuttle body 2 performs a linear reciprocating motion between the positions B and C with nearly constant speed to carry out recording or reproducing.

When recording or reproducing is completed, the shuttle body 2 stops at the position B shown in FIG. 16 (C), and then is moved from the position B to the position A shown in FIG. 16 (B) to unload the optical card 1.

As in the above, the motion of the shuttle body 2 consists of the two kinds of motion, namely, a shifting motion between the positions A and B for loading/unloading the optical card 1 and a constant speed linear reciprocating motion between the positions B and C for carrying out recording or reproducing information signals for the optical card. Since these two kinds of motion will never be performed simultaneously, it is possible to assign the role of driving these two motions to a single driving motor 9.

Next, construction of a transporting and holding mechanism for the optical card that can perform the shifting motion in an effective manner will be described.

Figure 17:
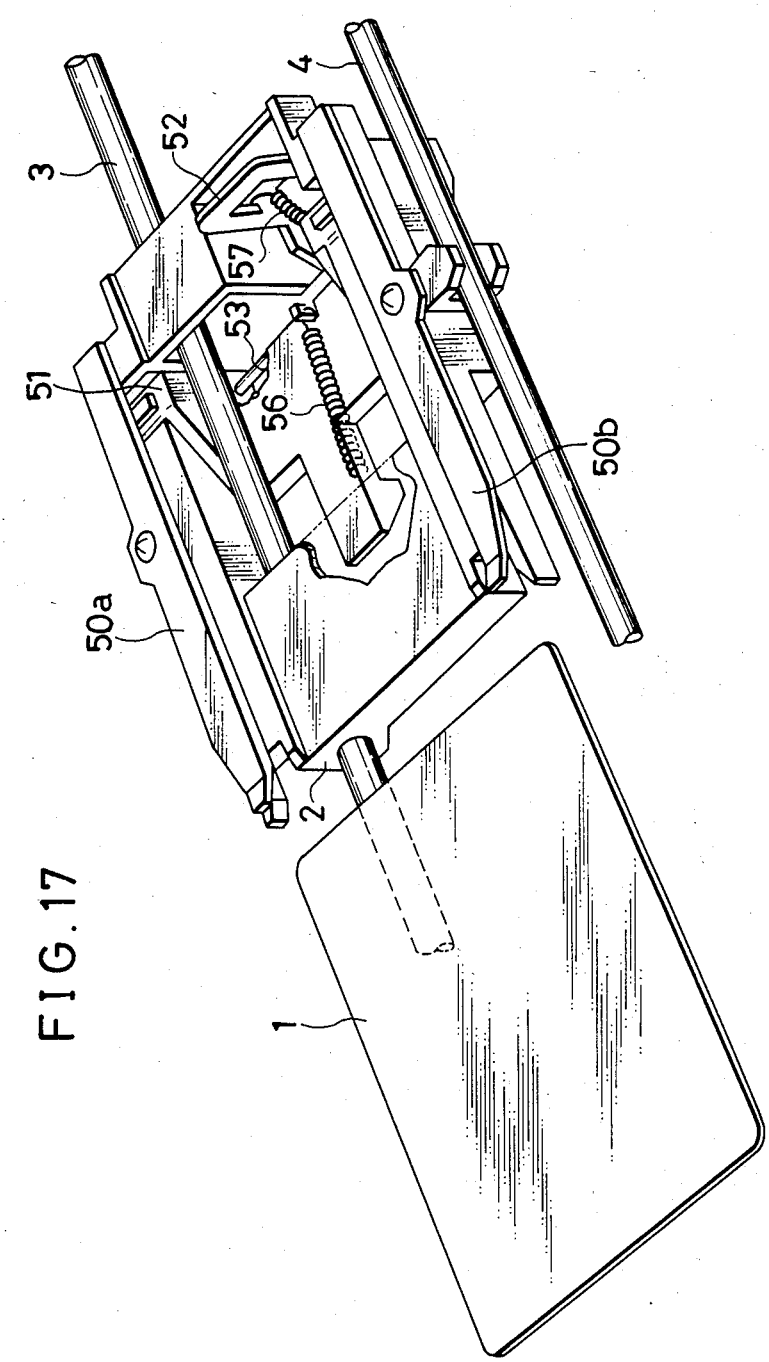
FIG. 17 is an overall perspective view for showing an embodiment of the optical card transporting and holding mechanism of the present invention.
Figure 18:
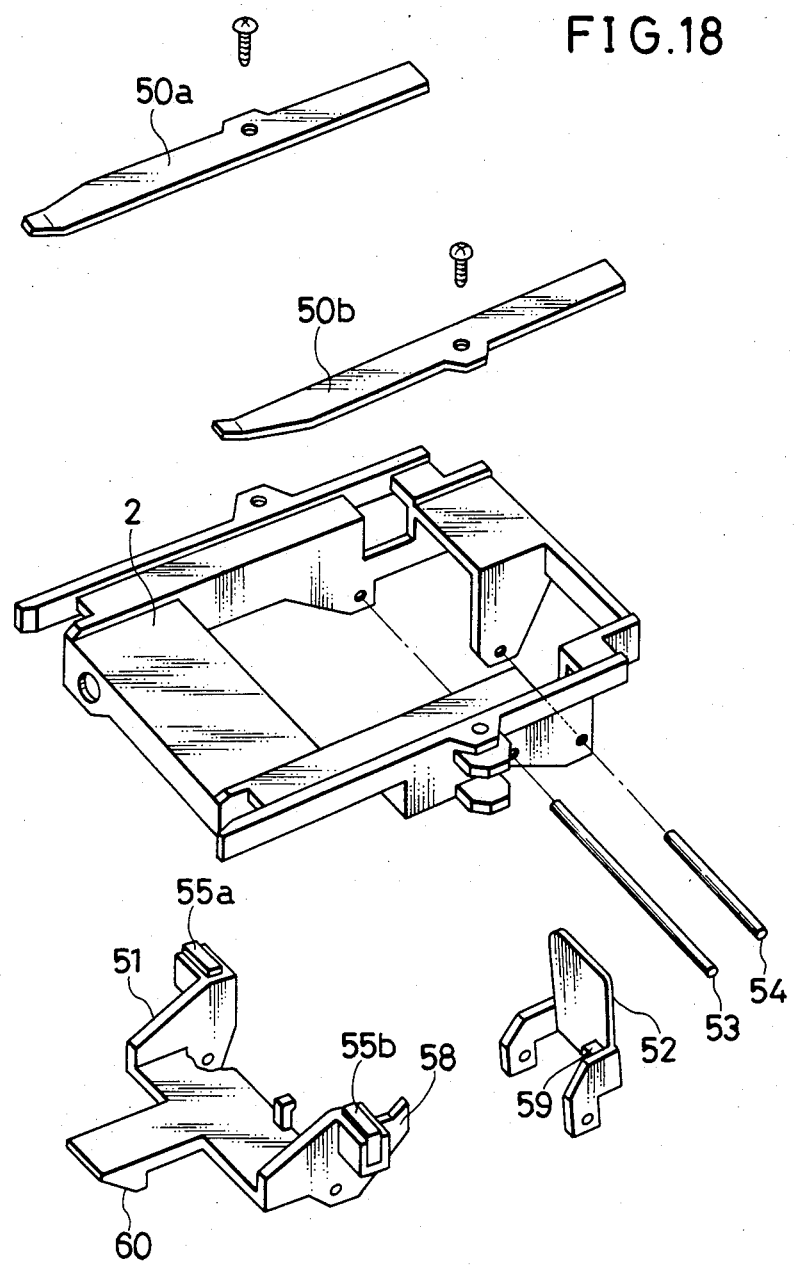
FIG. 18 is a disassembled perspective view of the embodiment shown in FIG. 17.
Figure 19:
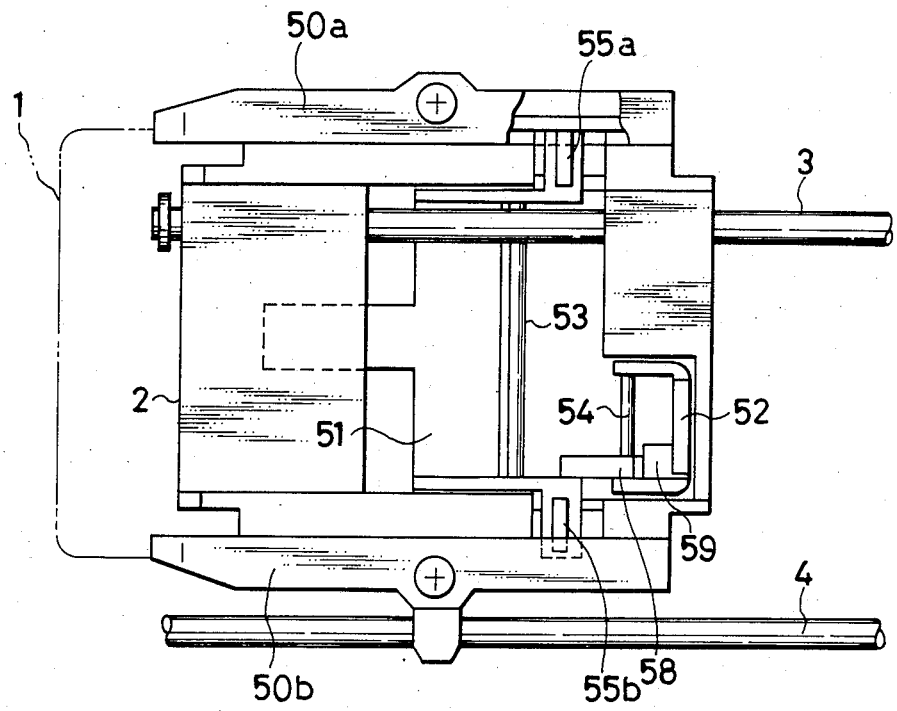
FIG. 19 is a plan view of the embodiment shown in FIG. 17.
Figure 20A:
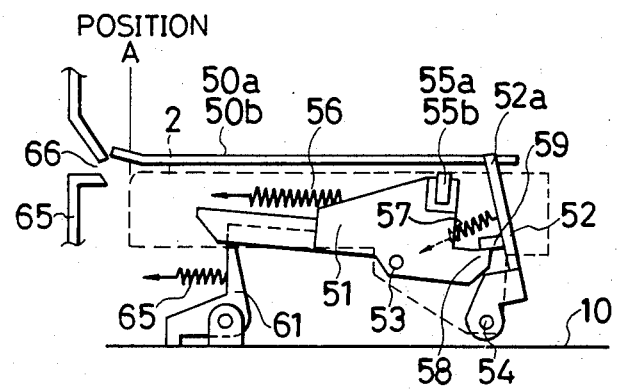
FIGS. 20 (A) to 20 (D) show side views for explaining the operation of the embodiment shown in FIG. 17.
Figure 20B:
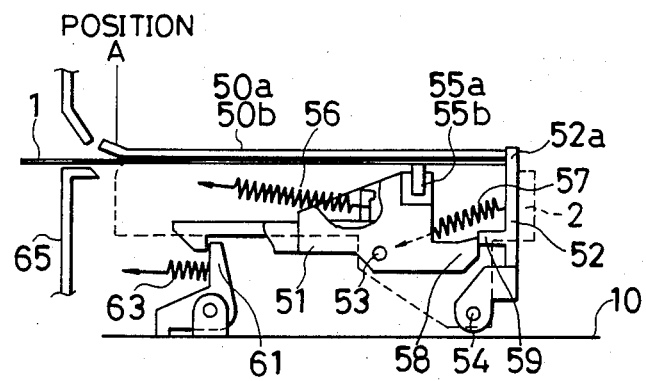
Figure 20C:
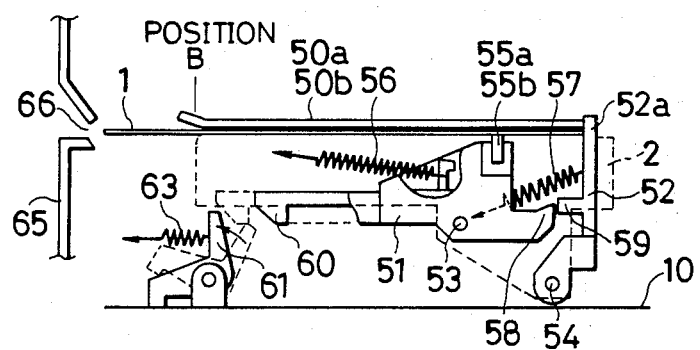
Figure 20D:
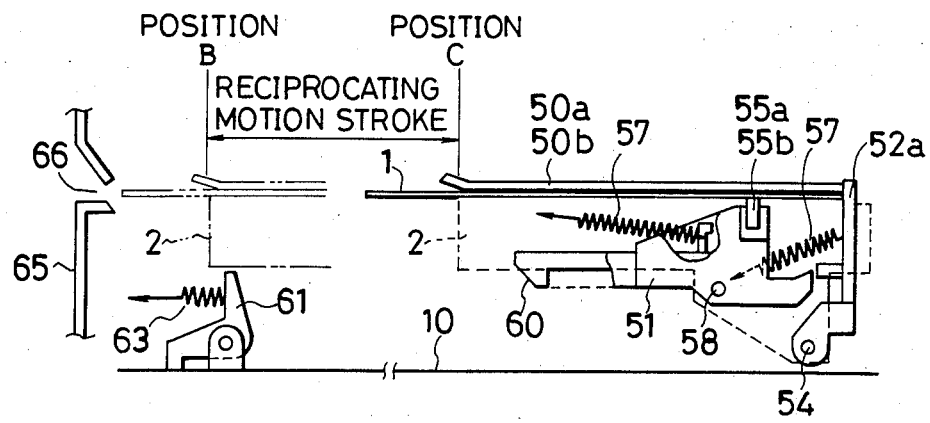

In FIGS. 17 to 19, the shuttle body 2 is supported by the guiding rods 3 and 4 in a manner to be shifted back and forth. Further, on the shuttle body 2 there are attached pressing plates 50a and 50b with a spacing which is slightly larger than the thickness of the optical card, to facilitate the insertion and retrieval of the optical card.

Moreover, a card clamper 51 and an unlock hold lever 52 are mounted rotatably on the shuttle body 2 by means of the pins 53 and 54, respectively. The optical card clamper 51 has clamping fingers 55a and 55b for clamping the optical card 1, and the clamping fingers 55a and 55b are made of an elastic body with large friction coefficient between the optical card 1, for example, rubber, for the purpose of clamping the optical card 1.

The optical card clamper 51 and the unlock hold lever 52 are attached to one end of springs 56 and 57 that will be described later, for clamping and for releasing the clamping of the optical card 1. The other end of the respective springs 56 and 57 are attached to the shuttle body 2.

Further, there is formed a pawl 58 in the optical card clamper 51, and there is formed a projection 59 in the unlock hold lever 52 for checking the rotation of the unlock hold lever 52 by letting it engage with the pawl 58. Moreover, a sloped cam 60 is provided in the optical card clamper 51. A release lever 61 that engages with the sloped cam 60 is mounted rotatably on a chassis 62, as shown in FIG. 20.

The release lever 61 is energized by a spring 63 in the counterclockwise direction in FIG. 20 (toward the front direction of the shuttle body), and is mounted on the chassis 62 in such a way as to permit the turning in clockwise direction by elongating the length of the spring 63, but check the rotation in the counterclockwise direction, with the chassis body 10 acting as a stopper, as shown in FIG. 20.

With the construction as in the above, the transporting and holding mechanism of the optical card 1 will be described in what follows.

In FIG. 20, FIG. 20 (A) represents the state prior to the insertion of the optical card 1 or the state which permits the retrieval of the optical card 1, and the position of the shuttle body 2 in this state will be called A. Here, the pawl 58 of the optical card clamper 51 that is energized in the front upper direction of the shuttle body 2 by the spring 56 is held down by the projection 59 of the unlock hold lever 52 that is energized in the front lower direction of the shuttle body 2 by the spring 57. Since the energizing power of the spring 57 is slightly larger than that of the spring 56, the spring 56 is elongated and the pawl 58 of the optical card clamper 51 is held down by the projection of the unlock hold lever 52. In this state of pressed down, the spacing between the clamping fingers 55a and 55b provided in the optical card clamper 51 and the pressing plates 50a and 50b is set to be larger than the thickness of the optical card 1, so that insertion and retrieval of the optical card 1 can be done freely.

First, the operation of insertion of the optical card 1 will be described. The optical card 1 is inserted through the optical card insertion opening 66 in the front panel 65. At this time, the shuttle body 2 is held fixed not to move by a locking means that is not shown. The optical card 1 makes a direct contact with the head portion 52a of the unlock hold lever 52, and when the optical card 1 is pushed in further, the unlock hold lever 52 is turned around the pin 54 in clockwise direction, as shown in FIG. 20 (B), by elongating the length of the spring 57. Then, the projection 59 that was holding down the pawl 58 releases the pawl 58, and the optical card clamper 51 is turned around the pin 53 in counterclockwise direction in the figure by the energizing force of the spring 56. By this action, the clamping fingers 55a and 55b provided in the optical card clamper 51 presses the optical card 1. Therefore, the optical card 1 is clamped by the pressing plates 50a and 50b and the clamping fingers 55a and 55b.

Further, the pawl 58 of the optical card clamper 51 makes a direct contact with the projection 59 of the unlock hold lever 52, and prevents the turning of the unlock hold lever 52 in the counterclockwise direction in the figure due to the force of the spring 57.

By detecting with a microswitch or the like (not shown) that the optical card 1 is clamped, the locking action of the locking means mentioned earlier is released, and the shuttle body 2 is moved from the position of the state in which the optical card 1 is sticking out as shown in FIG. 20 (B) to the position B of the state shown in FIG. 20 (C) in which the optical card 1 is taken completely to the inside of the device from the optical card insertion opening 66, by means of the driving motor (not shown). Then, the sloped cam 60 that is provided in the optical card clamper 51 is engaged with the release lever 61, and passes over the release lever 61 by turning it in the counterclockwise direction in the figure by elongating the length of the spring 63.

The shuttle body 2 that is moved to the position B carries out the reciprocating motion, by means of the driving motor that is not shown in the figure, between the positions B and C by being supported by the guiding rods 3 and 4, as shown in FIG. 20 (D), in order to carry out recording or reproducing for the optical card 1.

Next, the retrieval action of optical card 1 after completion of recording or reproducing for the optical card 1 will be described. When recording or reproducing for the optical card 1 is completed, the shuttle body 2 is stopped at the position B. Then, the shuttle body 2 is moved by the driving motor that is not shown in the figure from the state of FIG. 20 (C) to the state of FIG. 20 (B), that is, from the position B to the position A.

In the midst of the shift, the sloped cam 60 that is provided in the optical card clamper 51 makes a direct contact with the release lever 61. Since, however, the release lever 61 is set to be unable to be turned in the counterclockwise direction in the figure by the body of chassis 10, the sloped cam 60 is pushed upward by the release lever 61, and the optical card clamper 51 is turned in the clockwise direction in the figure by elongating the length of the spring 51. Here, the pawl 58 of the optical card clamper 51 that was obstructing the turning of the unlock hold lever 52 by pressing against the projection 59 of the unlock hold lever 52 is turned to underneath of the projection 59, and the pawl for obstructing the turning is moved. Then, the unlock hold lever 52 is turned counterclockwise in the figure, and the projection 59 holds down the pawl 58 as shown in FIG. 20 (A).

Consequently, the pressing of the clamping fingers 55a and 55b that was pressing the optical card 1 is released, and retrieval of the optical card 1 becomes possible. Then, by the turning of the unlock hold lever 52 the optical card 1 is pushed out quickly.

As described in the foregoing, the optical card 1 can be clamped automatically in the shuttle body 2 by inserting the optical card 1 through the optical card insertion opening 66, and the optical card can be pushed out automatically, by the action of the shuttle body 2 to return to its initial position after completion of recording or reproducing.

Further, the shuttle body 2 is controlled, as shown in FIG. 20, to be moved between the position A and the position B during loading/unloading of the optical card 1, and to be moved between the position B and the position C during the operation of recording or reproducing for the optical card 1. The reason for this is that in carrying out recording or reproducing by the use of the optical card 1, the optical card 1 has to be given a continuous linear reciprocating motion with reasonable speed, and that if the optical card 1 sticks out of the optical card insertion opening 66 in each leg of the reciprocating motion, there is a fear that the operator may unwittingly touch the optical card 1 which may interfere with recording or reproducing. Accordingly, the optical card 1 is arranged to be housed completely in the interior of the device during recording or reproducing.

As in the above, by the simple operation of insertion, the optical card 1 can be clamped securely without slippage during recording or reproducing, and satisfactory recording or reproducing can be accomplished without being influenced from the exterior.

Figure 21A:
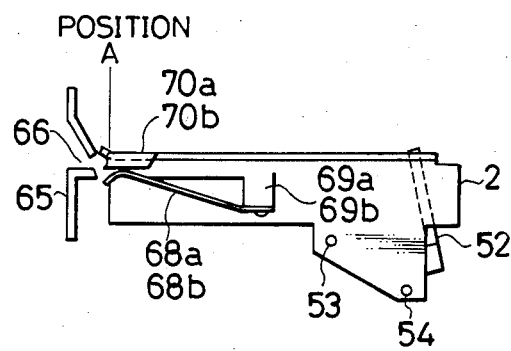
FIGS. 21 (A), 21 (B) and 22 are a side view and a perspective view, respectively, of another embodiment of the present invention.
Figure 21B:
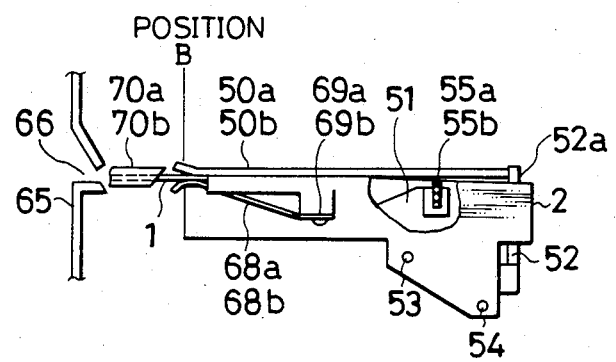
Figure 22:
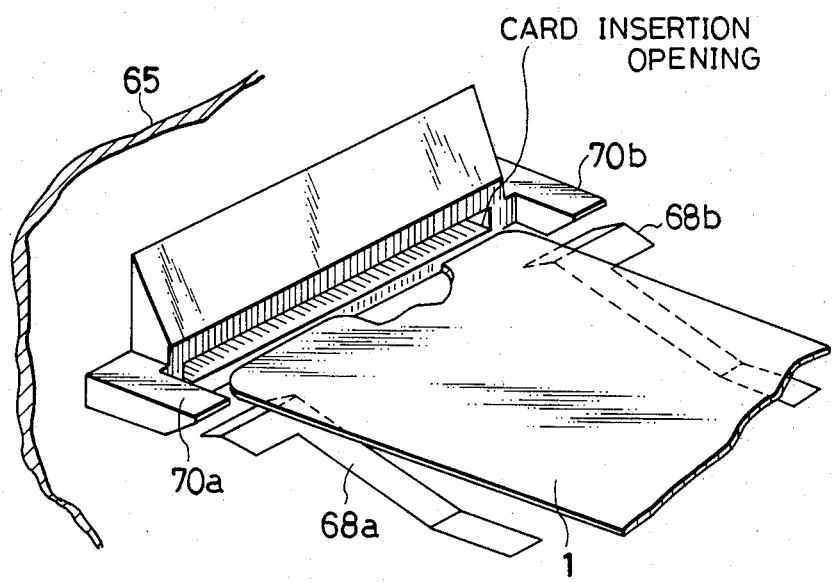

Next, a modification to the above embodiment will be shown in FIGS. 21 and 22. Now, the optical card 1 usually has a certain degree of warping or twisting which may sometimes affect recording or reproducing. Therefore, this modification is provided on the shuttle body 2 with springs 68a and 68b for pressing down optical card to the shuttle body 2 for clamping the optical card 1 with high precision.

As shown in FIGS. 21, the springs 68a and 68b for pressing down optical card are fixed to the posts 69a and 69b that are projected from the shuttle body 2, by means of screws or the like, and are energized to press down the optical card 1.

Further, on both sides on the interior side of the optical card insertion opening 66 of the front panel 65, there are provided cancelers 70a and 70b for releasing the action of the springs 68a and 68b for pressing down card, as shown in FIG. 22.

In such a construction, before insertion of the optical card 1 and in the state in which the optical card 1 is ready to be retrieved, the tip of the shuttle body 2 is at the position of A as shown in FIG. 21 (A), and the tip of the optical card pressing units of the springs 68a and 68b for pressing down optical card are pressed down by the cancelers 70a and 70b, so that insertion and retrieval of the optical card 1 can be carried out smoothly.

When the optical card 1 is inserted, actions similar to FIGS. 20 (A) and 20 (B) will be carried out. (Description of the actions will be omitted here.)

Next, the shuttle body 2 will be moved to the position B by the set-up that will be described later, as shown in FIG. 21 (B). At this time, the tips of the springs 68a and 68b for pressing down optical card leave the cancelers 70a and 70b to press down optical card 1. By this action, the optical card 1 is clamped at four points, namely, two points where the springs 68a and 68b for pressing down optical card meet the pressing plates 50a and 50b with the optical card in between, and two points where the clamping fingers 55a and 55b touch the optical card 1. As a result, the optical card is held sufficiently flat, and there will occur no slippage in the positioning of the optical card during recording or reproducing.

Figure 23:
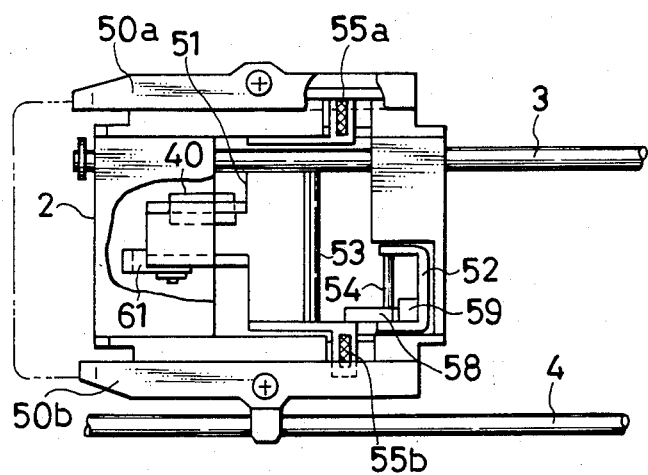
FIGS. 23, 24 (A) and 24 (B) are a plan view and a side view, respectively, of still another embodiment of the present invention.
Figure 24A:
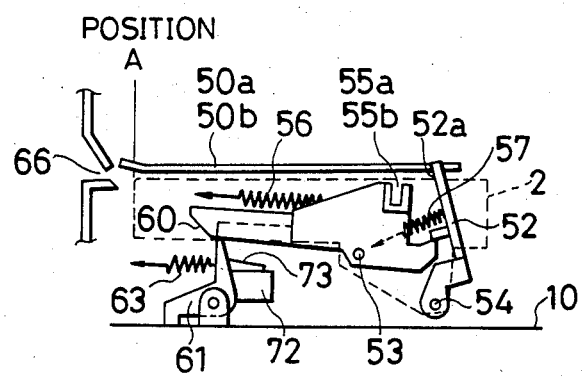
Figure 24B:
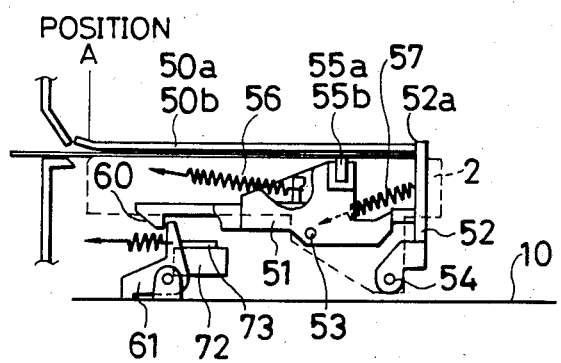

Further, in FIGS. 23 and 24 there is shown a structure in which there is provided a sensor such as microswitch 72 for detecting the clamping of the optical card 1. The components that are identical to or correspond to those of FIGS. 19 and 20 are given identical symbols to omit further explanation.

FIG. 24 (A) shows the state prior to the insertion of the optical card 1 or the state in which the optical card 1 is ready to be retrieved. The pawl 58 of the optical card clamper 51 is pressed down by the projection 59 of the unlock hold lever 52 so that the sloped cam 60 that is provided in the optical card clamper 51 is not pushing the actuator of the microswitch 72.

When the optical card 1 is inserted completely as shown in FIG. 24 (B), the optical card clamper 51 is turned around the pin 53 as mentioned earlier.

By this action, the clamping fingers 55a and 55b clamp the optical card 1. At the same time, the apex portion of the sloped cam 60 pushes the actuator 73 of the microswitch 72 to drive the driving motor that is not shown, and moves the shuttle body 2 to the position B as shown in FIG. 20 (C).

In what follows the driving power transmitting mechanism for the embodiments of the present invention will be described in detail.

Figure 25:
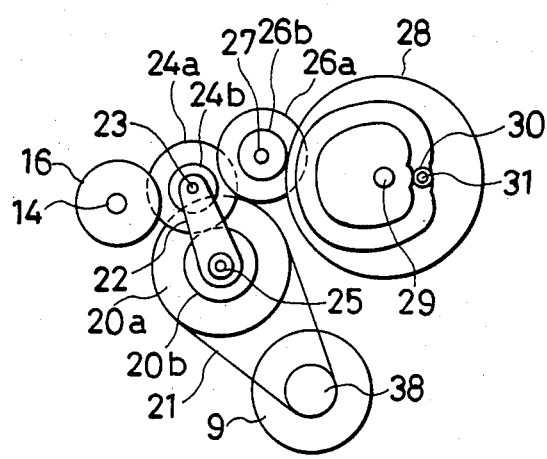
FIGS. 25 to 27 are diagrams for explaining the engaging conditions of gears for drive transfer of the optical card recording and reproducing device according to the present invention.

FIG. 25 shows the conditions of engagement of the gears for drive transmission that are incorporated on the bottom surface of the sub-chassis 17, viewed from the top surface of the sub-chassis 17 as if they are seen perspectively.

Figure 26:
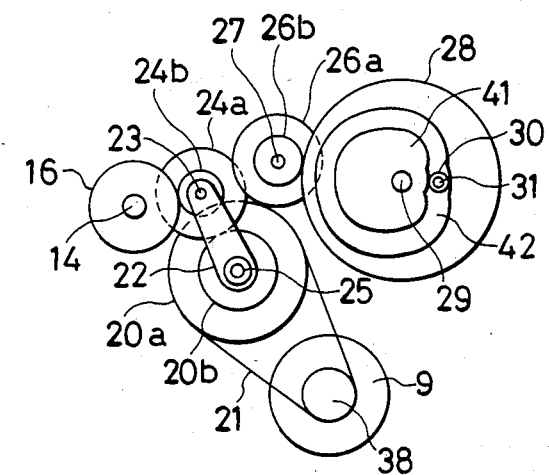

First, referring to FIGS. 25 and 26, the linear reciprocating motion between the position B and the position C of the shuttle body 2 in FIG. 16 will be described.

In FIG. 25, as the driving motor 9 rotates in the counterclockwise direction, a pulley 20a and a gear 20b are rotated also counterclockwise by means of a pulley 38 that is provided on the driving motor 9, via a belt 21. By this action, an arm 22 is turned slightly counterclockwise with a post 25 as the axis, and a gear 24b is pushed against a gear 16 to be engaged with it. By means of the gear 20b that is rotated in a united body with the pulley 20a, the gear 24a is rotated in the clockwise direction, the gear 24b that is formed in a united body with the gear 24a is rotated in the clockwise direction, and the gear 16 is rotated in the counterclockwise direction.

By the transmission of rotation, in this manner, of the driving motor 9 to the gear 16, the crank sub-arm 11 whose shaft 14 is mounted on the gear 16 is rotated. Then, the pins 12a and 12b that are planted in the crank sub-arm 11 and the crank arm 5 whose slits 13a and 13b are engaged with the pins 12a and 12b, are guided by the guiding cam 6, and let the shuttle body 2 to have a linear reciprocating motion with nearly constant speed, via the linking rod 8, by varying the length of the crank arm, as mentioned earlier. Further, the form of the cam groove 40 of the guiding cam 6 is determined so as to generate a linear reciprocating motion with nearly constant speed for the shuttle body 2 when the shaft 14 rotates continuously with constant speed, as described before.

Figure 27:
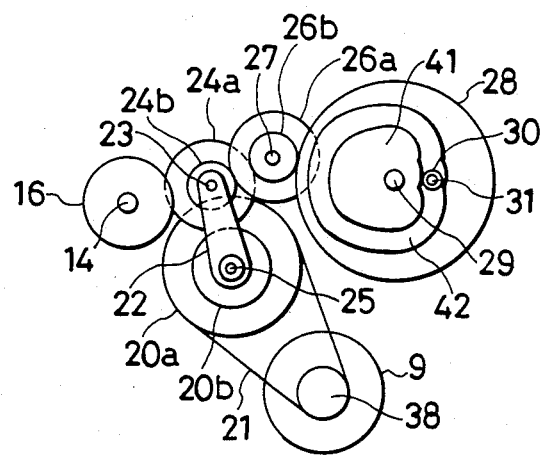

Next, referring to FIGS. 25 and 27, the shifting motion (loading/unloading of the optical card 1) of the shuttle body 2 will be described.

In FIG. 25, when the driving motor 9 rotates in the clockwise direction, the pulley 20a and the gear 20b are rotated also in the clockwise direction via the belt 21 by the pulley 38 that is attached to the driving motor 9. By this motion, the arm 22 rotates slightly in the clockwise direction with the post 25 as the axis, and the gear 24b is pressed against an intermediate gear 26a to be engaged with it, as shown in FIG. 27. The gear 24a is rotated in the counterclockwise direction by the gear 20b which is rotated together with the pulley 20a. This causes the gear 24b that is formed with the gear 24a into a united body to rotate in the counterclockwise direction, and the intermediate gear 26a is rotated in the clockwise direction. Then, an intermediate gear 26b that is formed with the intermediate gear 26a in a unified body causes to rotate a gear with cam 28.

The cam groove 42 of the gear with cam 28 is engaged with a cam follower roller 30 and the supporting shaft 31 of the cam follower roller 30 is mounted on the chassis body 10. Because of this, by the rotation of the gear with cam 28, the distance between the post 29 as the supporting shaft of the gear with cam 28 and the supporting shaft 31 of the cam follower roller 30 changes, in response to the variation in the radius of the cam groove 42 due to the eccentric cam 41.

When the distance between the post 29 and the supporting shaft 31 varies in this way, because of the fact that the supporting shaft 31 and the post 29 are mounted on the chassis body 10 and the sub-chassis 17, respectively, the sub-chassis 17 will be shifted by the amount of eccentricity of the eccentric cam 41. The amount of eccentricity of the eccentric cam 41 of the gear with cam 28, namely, the amount of variation in the radius of the cam groove 42 from the post 29 which is the center axis of rotation, is set to be equal to the moving distance between the position A and the position B of the shuttle body 2 shown in FIG. 16.

When the shuttle body 2 comes to a stop after completion of the linear reciprocating motion, the condition is detected by a sensor or the like (not shown), and it is in the state of the position B shown in FIG. 16 (C). By the motion of the sub-chassis 17 from this position to the position for loading/unloading of the optical card 1, the shuttle body 2 shifts to the state with the position A shown in FIG. 16 (A). When the sub-chassis 17 is moved in this way by the rotation of the gear with cam 28, the shuttle body 2 has to be moved also along with the sub-chassis 17. In order to make it possible, the linking rod 8 and the crank arm 5 have to be almost on a straight line, and the linking point has to hold the state of linearity of the linking rod 8 and the crank arm 5, in an almost locked condition.

Next, referring to FIGS. 28 and 29, the action of fixing the motion of the linking rod 8 by the locking lever 32 will be described. When the sub-chassis 17 begins to move from the position B to the position A shown in FIG. 16, due to the rotation of the gear with cam 28, the condition of the device shifts from the state of FIG. 28 to the state of FIG. 29.

Figure 28A:
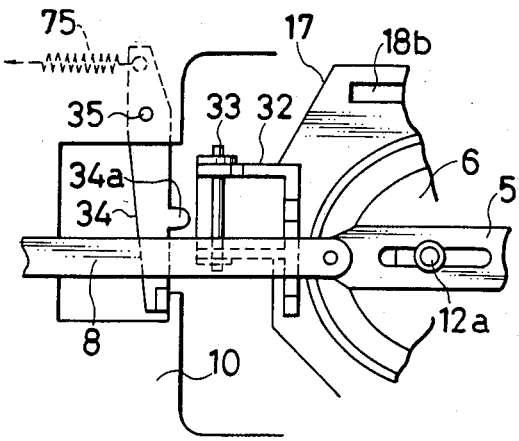
FIGS. 28 (A), 28 (B), 29 (A) and 29 (B) show plan views and side views for explaining the mechanism of locking the linking rod of the optical card recording and reproducing device according to the present invention.
Figure 28B:
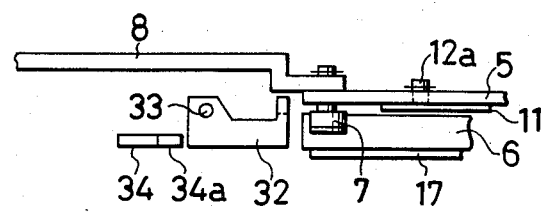
Figure 29A:
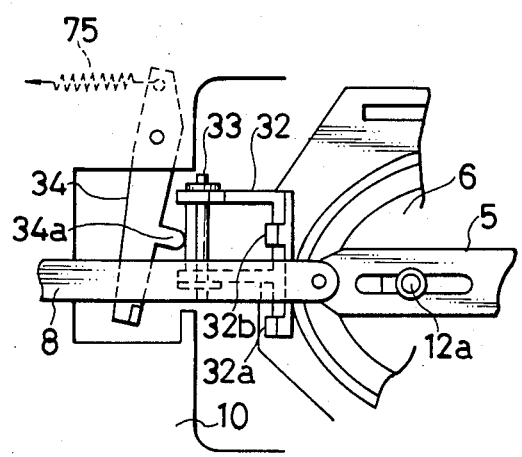
Figure 29B:
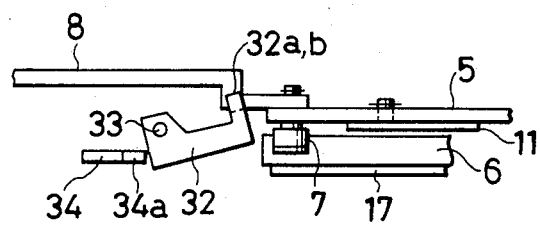

Namely, when the sub-chassis 17 to which is attached the locking lever 32 starts to move to the left in FIG. 28, the locking lever 32 presses the projection 34a on a push arm 34 that is attached to the chassis body 10, being energized by a spring 75 in the counterclockwise direction. When the sub-chassis 17 is further moved to the left, the projection 34a of the push arm 34 that is energized by the spring 75 pushes the locking lever 32 and the locking lever 32 is rotated in the counterclockwise direction with a pin 33 as the axis, as shown in FIG. 29. Then, the projections 32a and 32b of the locking lever 32 project out so as to hold the linking rod 8 in between. By means of the projections 32a and 32b, the linking rod 8 is fixed (locked) in nearly linear positional relationship with the crank arm 5. The condition of being locked is maintained while the shuttle body 2 moves from the position B to the position A shown in FIG. 16, so that when the sub-chassis 17 is moved, the shuttle body 2 is also moved jointly between the position A and the position B.

As in the above, by the rotation of the driving motor 9 in the clockwise direction, the shuttle body 2 is moved back and forth between the position A and the position B.

Namely, in the above embodiment, when the driving motor 9 is rotated in the clockwise direction, there is carried out the shift of the shuttle body 2 for loading-/unloading the optical card 1, whereas when the driving motor 9 is rotated in the counterclockwise direction, there is carried out a linear reciprocating motion of the shuttle body 2 for recording or reproducing for the optical card 1.

As in the above, the loading/unloading operation of the optical card and the recording or reproducing operation for the optical card are designed to be realizable by the forward and reverse rotations of a single driving motor. In addition, the linear reciprocating motion is arranged to be carried out by a continuous rotation of the driving motor at a constant speed. As a result, severe burdens on the driving motor such as quick starting, quick deceleration, and quick reverse rotation can be avoided, so that use may be made of a driving motor of small size and low torque. Moreover, a continuous rotation with constant speed is needed for recording or reproducing, and a reverse rotation with constant speed is needed for loading/unloading of the optical card, so that the circuit for controlling the rotation of the driving motor can be simplified considerably. Thus, it will be extremely effective for reduction of the manufacturing cost due to the fact that a single driving motor may be served for two operations, and use may be made of a general purpose small-sized motor with simplified control circuit.

Next, referring to FIGS. 30 and 31, modifications to the driving power transmission mechanism in the above will be described.

Figure 30:
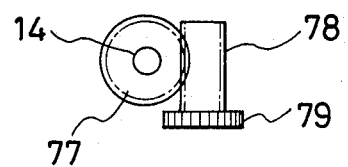
FIGS. 30 and 31 are diagrams for explaining side view and engaging conditions of gears for another embodiment of the optical recording and reproducing device according to the present invention.

FIG. 30 shows that the transmission of the rotation of the driving motor 9 is accomplished, instead of by the use of a flat gear 16, by means of a worm wheel 77 and a worm 78. The shaft 14 of the crank sub-arm 11 is fitted into the worm wheel 77, and the worm 78 which is formed in a unified body with a gear 79 is engaged with the worm 78.

By a combination of the worm wheel 77 and the worm 78 as in the above, the rotation from the driving motor 9 is transmitted from the worm 78 side to the worm wheel 77 side. Therefore, the rotation of the driving motor can be transmitted to the crank sub-arm 11, but the rotation on the worm wheel 77 side will not be transmitted to the worm 78 side. In other words, even if the worm wheel 77 is attempted to be rotated, it is designed that the worm 78 will not be rotated.

Therefore, in shifting the sub-chassis 17 between the position A and the position B of FIG. 16 for loading/unloading the optical card 1, locking of the linking rod 8 was carried out in the previous embodiment by means of the locking lever 32 and the push arm 34. In the present modification the worm wheel 77 and the worm 78 have a locking function so that the locking lever 32 and the push arm 34 become unnecessary and the structure becomes simplified accordingly.

Figure 31:
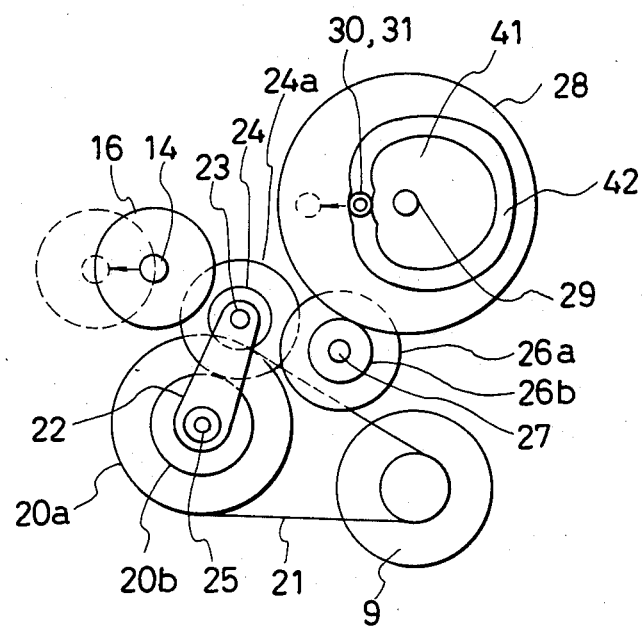

Moreover, in FIG. 31, the engagement conditions of the gears that are incorporated in the chassis body 10, instead of the driving motor 9 and the gears for transmitting the driving power that are incorporated in the sub-chassis 17 as shown in FIG. 15, are shown as seen perspectively from the chassis body 10. The cam follower roller 30 that is engaged with the cam groove 42 of the eccentric cam 41 that is provided in a unified body with the gear with cam 28, and the supporting shaft 31 of the cam follower roller 30 are mounted on the sub-chassis 17. As shown in FIG. 16, the sub-chassis 17 is shifted between the position A and the position B, so that it becomes possible to reduce sharply the weight of the sub-chassis 17 that is movile, by incorporating the driving motor 9 and the gears for transmitting the driving power in the chassis body 10 that is stationary. Therefore, there can be realized an advantage that the burden during the motion can be reduced. Further, the wirings for the driving motor 9 and the sensor for detecting the rotation angle (not shown) of the gear with cam 28 that are required were handled also as moving parts in the previous embodiments. It will be clear, however, that the reliability and productivity will be enhanced by incorporating these wirings in the stationary chassis body 10 rather than in the moving sub-chassis 17.

Furthermore, for the embodiments in the foregoing, description was given in conjunction with the case in which the linear reciprocating motion device is incorporated in the optical card recording and reproducing device. However, the present invention is not limited to that case alone. In other words, in these embodiments, the optical card had to be given a linear reciprocating motion with constant speed during recording or reproducing, and moreover, the form of the guiding cam had to be determined geometrically so as to give the shuttle body which is the object to be driven a linear reciprocating motion with constant speed. However, the present invention can also be applied to the case of linear reciprocating motion with variable speed by realizing the desired speed pattern through a simple change in the form of the guiding cam. The case of linear reciprocating motion with variable speed will be effective when the variations in acceleration during the operations of starting, stopping, and reversal are desired to be gentle, namely, when the vibrations and shocks to the object to be driven are desired to be minimized. Thus, for instance, the present invention may be applied also to the transfer device for transporting works for machine tool or industrial machinery.

Moreover, the present invention can be applied, in addition, to devices of linear reciprocating motion with constant speed such as perforator, embossing machine, and printing machine.

What is claimed is:

1. A linear reciprocating uniform motion device, comprising:
    an object being slideable exclusively in a prescribed direction;
    cam groov formed on a closed curve;
    a linking rod having a first end connected to said object and a second end engaged with said cam groove;
    a crank arm being rotatable in the interior of said closed curve, one end of said crank arm being connected to the second end of said linking rod; and
    means for rotating said crank arm to move the second end of said linking rod along said cam groove with a prescribed angular velocity so as to give said object a linear reciprocating uniform motion and given an acceleration and deceleration at the neighborhood of the position where the direction of the motion of said object is to be reversed, wherein a lenght L of said linking rod is determined by the following equation;

$$L = max\{P_1 - S_c(\theta - \theta_s)/(180 - 2\theta_s)\}\sin\theta$$

where $P_1$ is a starting point of the uniform motion of said object; $S_c$ is a stroke for a segment of the uniform motion of said object; $\theta$ is a rotation angle of said crank arm, $\theta_s$ is a rotation angle of said crank arm at a segment of the acceleration and deceleration, $\theta_s \leq \theta \leq 180 - \theta_s$, and $0 < \theta_s < 90$, and wherein a locus Q of the second end of said linking rod is determined by the following equations, $$y = x \cdot \tan\theta,$$

$$(x-p)^2 + y^2 = L^2,$$

$$P = P_1 - S_c(\theta - \theta_s)/(180 - 2\theta_s),$$

$$L = max\{P_1 - S_c(\theta - \theta_s)/(180 - 2\theta_s)\}\sin\theta,$$

where (x,y) are coordinates for each point Q of the second end of said linking rod, P is a point of the motion of said object, $P_1$ is a starting point of the uniform motion of said object, $S_c$ is a stroke for a segment of the uniform motion of said object.

2. The linear reciprocating uniform motion device as claimed in claim 1, wherein said crank arm rotating means comprises a motor for rotating a crank sub-arm which is linked to said crank arm at a constant speed.

3. The linear reciprocating uniform motion device as claimed in claim 1, wherein said rotating means comprises: a motor and a crank sub-arm that is rotated within said closed curve by means of the driving power from the motor, said crank sub-arm having projections at opposite ends extending from opposite ends of a first side of said crank sub-arm and a rotation shaft extending from a second side of said crank sub-arm at a position between said projections, and said crank arm having slits that engage with said projections, said crank arm being freely slideable in one direction with respect to said crank sub-arm.

* * * * *